(No Model.)  2 Sheets—Sheet 1.
W. G. ADAMS & J. S. FORBES.
VALVE FOR STEAM OR HIGH PRESSURE FLUIDS.
No. 479,391.  Patented July 26, 1892.
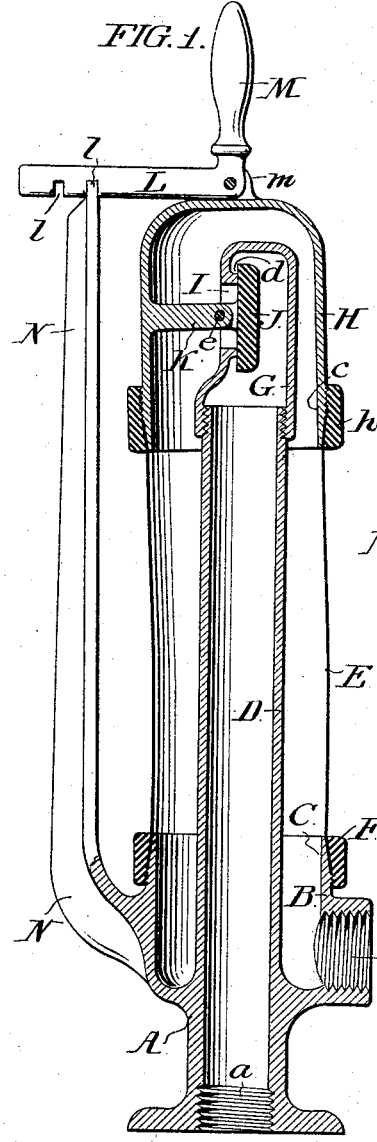
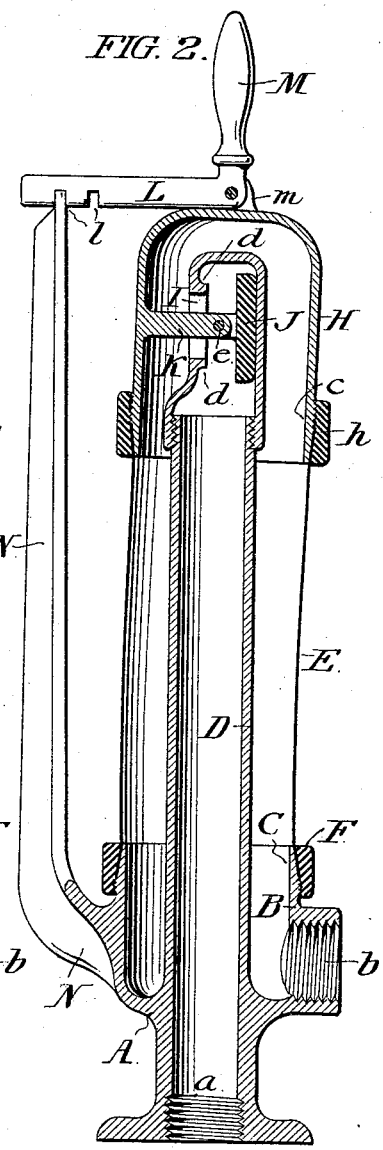
WITNESSES:
James H. Bell
Henry M. Paul Jr.
INVENTORS
W. G. Adams and
John S. Forbes
By Hollingsworth & Haley
Attorneys
THE NORRIS PETERS CO., PHOTO-LITHO., WASHINGTON, D. C.

(No Model.) 2 Sheets—Sheet 2.
W. G. ADAMS & J. S. FORBES.
VALVE FOR STEAM OR HIGH PRESSURE FLUIDS.
No. 479,391. Patented July 26, 1892.
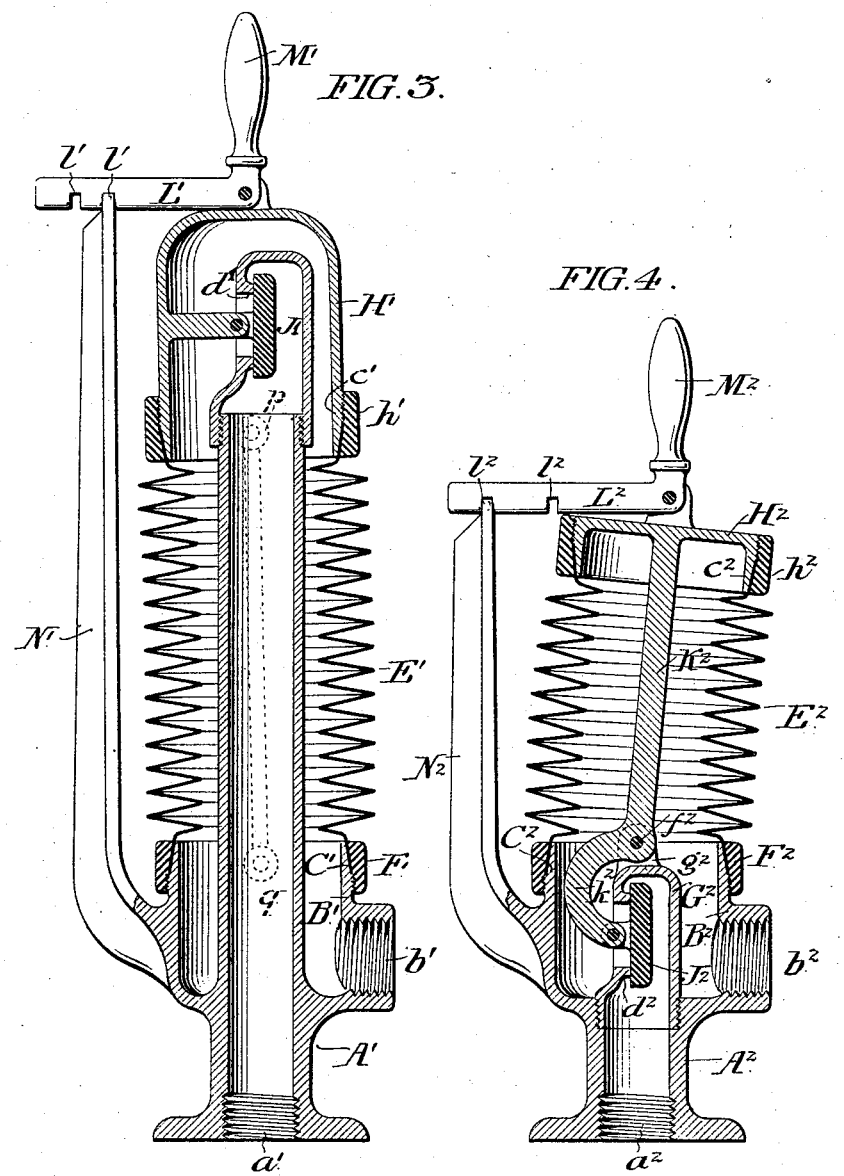

UNITED STATES PATENT OFFICE.

WILLIAM G. ADAMS AND JOHN SIMS FORBES, OF PHILADELPHIA, PENNSYLVANIA.

VALVE FOR STEAM OR HIGH-PRESSURE FLUIDS.

SPECIFICATION forming part of Letters Patent No. 479,391, dated July 26, 1892.

Application filed October 3, 1891. Serial No. 407,590. (No model.)

*To all whom it may concern:*

Be it known that we, WILLIAM G. ADAMS and JOHN SIMS FORBES, both of Philadelphia, in the State of Pennsylvania, have invented certain new and useful Improvements in Valves for Steam or High-Pressure Fluids, whereof the following is a specification, reference being had to the accompanying drawings.

In said drawings, Figures 1 and 2 represent what may be termed a "typical embodiment" of our invention in its simplest or most elementary form, the device being shown in vertical central section and the valve being shown in a closed position in Fig. 1 and in an open position in Fig. 2. Figs. 3 and 4 are similar sectional views representing two other forms of the valve differing in detail, but the same in principle as the form shown in Figs. 1 and 2.

The object of our invention is to provide a valve whose actuating devices are so arranged as to avoid the use of a stuffing-box or packed gland and at the same time to obviate certain objections which are found in the class known as "diaphragm-valves," as will be hereinafter more particularly set forth.

Referring to Figs. 1 and 2 of the drawings, the valve-body consists of a metal base A, provided with a threaded opening at $a$ for communicating with the inlet-pipe and having an upwardly-prolonged rigid tube D, preferably coaxial with the said opening. The upper portion of said base is surrounded by a cup-shaped flange B, having a lateral orifice $b$ for connection with the outlet or exit pipe. The upper edge or rim of said flange is tapered, as shown, and below the tapered portion is provided with an external screw-thread, as indicated at C. A rigid standard N extends upward from one side of said base to serve as a convenient means for holding the valve in an open or closed position, as will hereinafter be described.

A flexible and preferably elastic casing E, which may be a tube of thin metal, is connected at its lower end with the rim B by means of an annular nut F, engaging with the screw-thread upon said rim and forcing or jamming the lower edge of the tube against the tapered portion of the rim, so as to form an absolutely-tight joint. A cup-shaped head H is similarly secured to the upper end of the tube E by means of an annular nut $h$ engaging with a thread upon the head and forcing the edge of the tube into close contact with the tapering rim $c$ thereof, as indicated. The upper portion of the rigid tube D is provided with a cap G, preferably screwed thereon and having a lateral orifice I, whose raised annular periphery $d$ constitutes the seat for the valve J. Said valve J, which may be a disk of metal or other suitable material, is pivoted at $e$ to a rigid arm K, projecting inward from the side of the head H in juxtaposition to the opening I. The movement of the valve toward or from its seat is effected by rocking or bending the tube E transversely to its longitudinal or central axis, and as said tube E and its head H (from the inside of which the valve J is suspended) absolutely inclose the rigid tube D and its cap G (in which the seat is formed) the apparatus remains at all times perfectly steam-tight. A handle M, pivoted to a lug $m$, cast upon the head H, carries a laterally-projecting blade or rod L, having notches $l\ l$ on its under side, which engage with the top of the standard N, so as to hold the blade, and consequently the head connected therewith, in the desired lateral position. In the position shown in Fig. 1 the tube E is rocked slightly to the left of a true vertical position and the relation between the length of the arm K and the position of the inner notch $l$ in the blade L is such that when in this position the valve J will be closed tightly against the seat $d$. In the position shown in Fig. 2 the tube E is rocked a similar distance to the right of a true vertical position, so as to throw the valve J clear of its seat, this position being maintained by engagement of the outermost notch $l$ upon the blade L with the standard N. It will be observed that the rocking movement necessary to open or close the valve J is thus effected by the bending of the tube E in a direction transverse to its central axis, and preferably the normal or true axis of the tube is so arranged with relation to the valve-seat that the bending shall take place equally on each side of said axis, so as to reduce the total deviation from the normal line thereof.

In the form of valve shown in Fig. 3 the cylindrical tube which formed the flexible casing is replaced by a corrugated tube E', the other parts of the structure remaining similar to those heretofore described, and to avoid repetition of the detailed description the corresponding parts are designated by similar letters with the prime-mark. Thus the base is indicated by A', the inner tube by D', &c.

To prevent the elongation of the corrugated tube E' when the internal pressure is considerable, we employ a pair of links P, (one of which is shown in dotted lines,) arranged on opposite sides and pivoted to the exterior of the head at $p$ and to the exterior of the base at $q$. In Fig. 3 said valve is only shown in its closed position; but the operation of the corrugated casing E' in permitting the necessary rocking movement for opening is precisely similar to that which has heretofore been described in the case of the cylindrical flexible tube E.

In the form shown in Fig. 4 the body $A^2$, its flange $B^2$, and inlet and outlet orifices $a^2$ and $b^2$, respectively, are similar to those already described; but instead of upwardly prolonging the interior rigid tube above the body the cap $G^2$ is arranged directly within the cup formed by said flange $B^2$. The flexible casing consists of a short corrugated tube $E^2$, secured to the upper portion of said rim $C^2$ in the same manner as before, and the head $H^2$ is similarly secured to the upper end of the tube; but said head is provided with a downwardly-depending rigid lever-arm $K^2$, whose lower end is curved, as indicated at $k^2$. At the commencement of said curved portion the arm $K^2$ is pivoted at $f^2$ to a lug $g^2$ upon the top of the cap $G^2$. The valve-disk $J^2$ is pivoted to the lower end of said curved part $k^2$ of the arm $K^2$, and thus the valve $J^2$ is shifted toward or away from its seat by the movement of the arm $K^2$ upon its pivot $f^2$. Such movement is of course effected, as in the former cases, by the oscillation or rocking of the flexible casing $E^2$ transversely to its central axis, and the valve is locked in either of its two positions by devices similar to those described in the other cases.

It is obvious that the character of this locking device and the number of positions in which the valve may be locked has no essential relation to the real features of the invention and may be varied at pleasure.

In the class of valves commonly known as "diaphragm-valves," where the valve is connected with a convex or slightly-conical diaphragm, the movement of the valve toward or from its seat is effected by the compression or expansion of the diaphragm in a direction coincident with what may be termed its "central axis," and even when instead of a shallow convex diaphragm an elongated cup or tube with corrugated sides has been employed the compression and elongation thereof to produce the opening and closing movement, respectively, has taken place in said direction. Where a shallow diaphragm is used, it is necessary, in order to obtain the desired range of movement, to increase the diameter to such an extent that the parts are unduly bulky and the total pressure upon the diaphragm is relatively very great. When, on the other hand, a corrugated cup or tube is employed and is to be expanded or compressed by a movement coincident with or parallel to its axis, such movement must take place against the resistance afforded by the outer and inner limits of the corrugations. The fold of metal at such outer and inner limits presents, by reason of its circular form, the characteristic resistance of an arch, and in order to permit the necessary movement when the tube is compressed axially the circle of the outer limits of the corrugations must be bodily enlarged and the circle of the inner limits thereof bodily compressed. This occasions buckling of the metal and irregular distortion of the several circles which bound the corrugations, leading to disintegration at the points subjected to the most strain.

The rocking movement peculiar to our device is lateral or transverse to the axis, and whether the casing be short or long the effect upon the metal is different in kind from that which takes place in the case of compression or elongation parallel with the axis. Thus instead of forcing the entire periphery outward at the outer limits of the corrugations and inward at the inner limits, our invention permits a compensating movement, the elongation upon one side occurring in conformity with the shortening of the other, so that the figure is changed symmetrically without irregular distortion or buckling.

We use the expression "rocking movement" to describe the peculiar mode of operation of our flexible valve-actuating casing, in order to distinguish such movement from that of compression or elongation in a straight line parallel to the axis.

Having thus described our invention, we claim—

1. The combination of a valve-body provided with inlet and outlet orifices and a valve-seat, a continuous closed casing capable of rocking movement mounted upon said body and communicating only therewith, and a valve operatively connected with said casing and so arranged with relation to said seat as to be shifted toward or from the same in conformity with the rocking movement of the casing, substantially as set forth.

2. The combination of a valve-body provided with inlet and outlet orifices and a valve-seat, a continuous closed casing capable of rocking movement mounted upon said body at a point intermediate between said inlet and outlet orifices, said casing being adjacent to but out of the direct path of the fluid, and a valve operatively connected with said casing and so arranged with relation to said seat as to be shifted toward or from the same in conformity with the rocking movement of the casing, substantially as set forth.

WILLIAM G. ADAMS.
JNO. SIMS FORBES.

Witnesses:
JAMES H. BELL,
HENRY N. PAUL, Jr.